US009686393B1

(12) United States Patent
Cai et al.

(10) Patent No.: US 9,686,393 B1
(45) Date of Patent: Jun. 20, 2017

(54) SYSTEM, METHOD AND COMPUTER PROGRAM PRODUCT FOR SERVICE CALL IDENTIFICATION

(71) Applicant: International Business Machines Corporation, Armonk, NY (US)

(72) Inventors: Keke Cai, Beijing (CN); Bai Chen Deng, Beijing (CN); Dongxu Duan, Beijing (CN); Zhong Su, Beijing (CN); Li Zhang, Beijing (CN); Xiaolu Zhang, Beijing (CN); Shiwan Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/271,295

(22) Filed: Sep. 21, 2016

(51) Int. Cl.
| | | |
|---|---|---|
| *H04M 1/56* | (2006.01) | |
| *H04M 15/06* | (2006.01) | |
| *H04M 3/42* | (2006.01) | |
| *H04M 1/663* | (2006.01) | |
| *H04M 1/57* | (2006.01) | |
| *H04M 3/436* | (2006.01) | |
| *H04M 1/2745* | (2006.01) | |
| *H04L 29/08* | (2006.01) | |

(52) U.S. Cl.
CPC ............ *H04M 1/663* (2013.01); *H04L 67/10* (2013.01); *H04M 1/274516* (2013.01); *H04M 1/575* (2013.01); *H04M 3/4365* (2013.01)

(58) Field of Classification Search
CPC ........ H04M 1/663; H04M 1/667; H04M 3/38; H04M 3/42323; H04M 3/436; H04M 2201/18; H04L 5/1079
USPC ............ 379/142.01, 142.05, 142.06, 142.17, 379/201.01, 201.05, 201.08, 201.09, 379/201.11, 201.12, 201.02
See application file for complete search history.

(56) References Cited

U.S. PATENT DOCUMENTS

| | | | |
|---|---|---|---|
| 8,687,785 B2 * | 4/2014 | Katkam | H04M 3/38 379/188 |
| 2007/0143422 A1 | 6/2007 | Cai | |
| 2008/0118046 A1 * | 5/2008 | Katkam | H04M 3/42323 379/198 |
| 2013/0301818 A1 * | 11/2013 | Chmara | H04M 1/57 379/142.05 |
| 2015/0140977 A1 | 5/2015 | Zhang et al. | |

\* cited by examiner

*Primary Examiner* — Binh Tieu
(74) *Attorney, Agent, or Firm* — Alexa L. Ashworth, Esq.; McGinn IP Law Group, PLLC

(57) ABSTRACT

A method, system, and computer program product, include receiving a request for registration from a service provider, the request for registration comprising characteristic information of a service call to be initiated, determining whether the service receiver has authorized the request for registration, and upon the service receiver having authorized the request for registration, registering the characteristic information of the service call for the service receiver to enable the identification of the service call.

20 Claims, 7 Drawing Sheets

| Element | Value |
|---|---|
| Service Provider | ABCD |
| User ID of service receiver | John |
| Caller's name | Mike |
| Phone number of the caller | 139000111 |
| Abstract | Three books bought on March 7, 2016 |
| Begin date | 14:00, 03/07/2016 |
| End date | 14:00, 03/09/2016 |
| Action | Insert |

SYSTEM, METHOD AND COMPUTER PROGRAM PRODUCT FOR SERVICE CALL IDENTIFICATION

BACKGROUND

The present invention relates generally to a system for service call identification, and more particularly, but not by way of limitation, to a system, method, and computer program product to enable a service receiver to identify service calls.

With the quickly development of Online-to-Offline (O2O) technologies and services, people receive a lot of daily service calls from service providers, like couriers, taxi drivers, food take-out providers or any other service providers. To receive the ordered services, people have to receive these service calls though the calling numbers of these service calls are not stored in phone number directory of the users' phones. Meanwhile, people also suffer a lot from strange/annoyance calls for advertisement, phone scams and so on that people do not want to receive at all. When a call from a strange calling number comes in, it is hard for people to quickly tell if the coming call is a service call that people have to pick up or just an crank call.

According to one existing solution to filter the unwanted coming calls, phone book directory is adopted in mobile phones to store the phone numbers of acquaintance of the mobile phones' owners. People could then refuse to pick up the coming calls from strange numbers that are not stored in the phone number directory while risk missing the service calls that they should pick up to receive the services. According to another existing solution to filter the unwanted coming calls, an online service could be provided to tell people in real-time whether the coming call has been marked as "crank call" in the database based on input from public, while some calls may be crank calls for some people but not for others.

SUMMARY

It can be understood from above description that the existing solutions for call filtering are either to block all the strange calls that would lead to missing of wanted service calls, or to use the same online database for all users without desired pertinence of the filtering.

To many service receivers under O2O business scenarios, there exists a need in the art to enable a service receiver to identify with high accuracy and pertinence whether a coming call from a strange number is a service call from a service provider that the service receiver wants to pick up, or from a crank/cold caller that should be filtered. Additionally and/or alternatively, there also exists a need in the art for the service receivers to know the context information of the coming service calls in real-time.

In an exemplary embodiment, the present invention can provide a computer-implemented method for service call identification, including receiving a request for registration from a service provider, the request for registration comprising characteristic information of a service call to be initiated, determining whether the service receiver has authorized the request for registration, and upon the service receiver having authorized the request for registration, registering the characteristic information of the service call for the service receiver to enable the identification of the service call.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
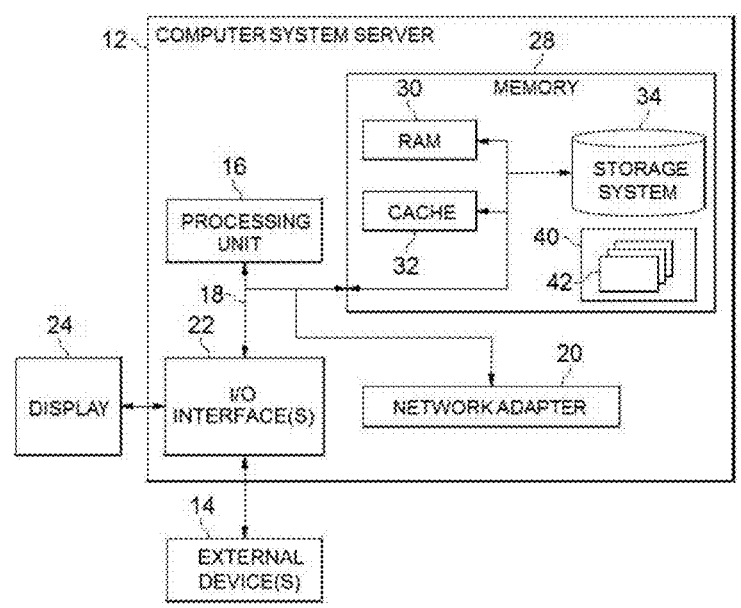
FIG. 1 depicts a cloud computing node 10 according to an embodiment of the present invention.

The invention will now be described with reference to FIG. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 3:
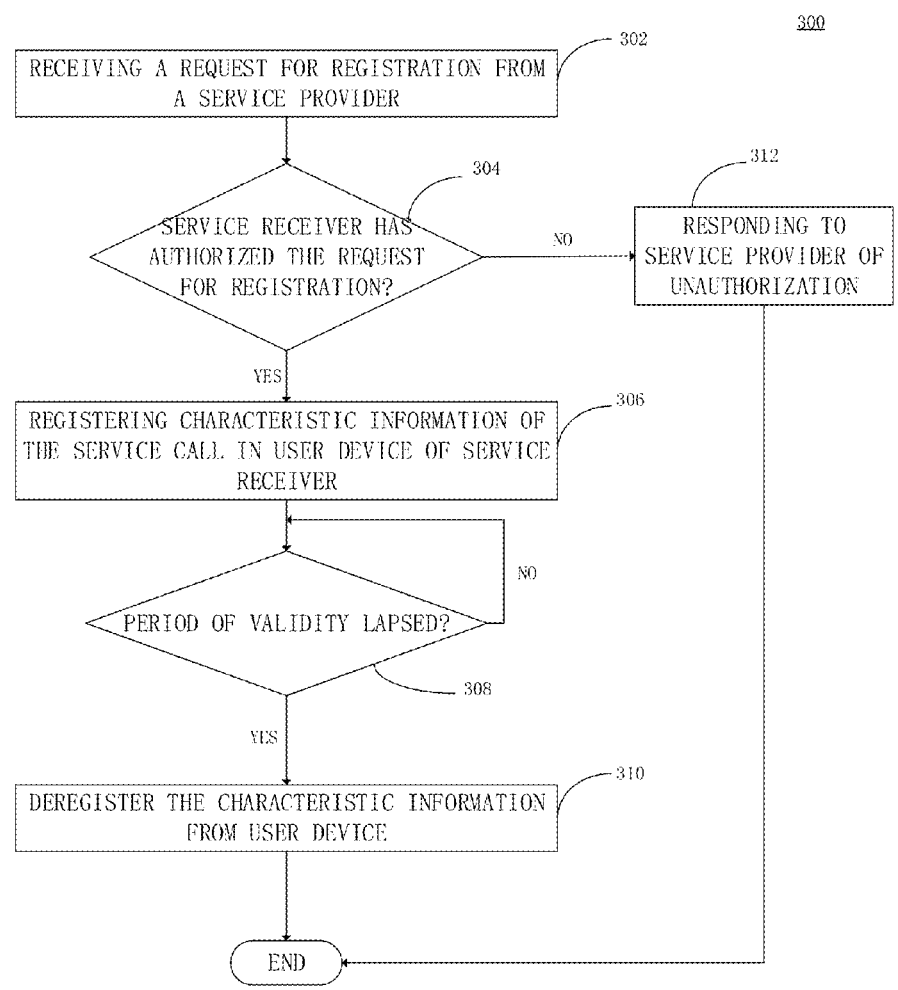
FIG. 3 is a flowchart of a method implemented in accordance with embodiments of the present disclosure.

With reference now to the example depicted in FIG. 3, the method 300 includes various steps to determine whether the service receiver has authorized the request for registration and upon the service receiver having authorized the request for registration, registering the characteristic information of the service call for the service receiver to enable the identification of the service call. As shown in at least FIG. 1, one or more computers of a computer system 12 according to an embodiment of the present invention can include a memory 28 having instructions stored in a storage system to perform the steps of FIG. 3.

Although one or more embodiments (see e.g., FIGS. 1 and 5-6) may be implemented in a cloud environment 50 (see e.g., FIG. 5), it is nonetheless understood that the present invention can be implemented outside of the cloud environment.

Figure 2:
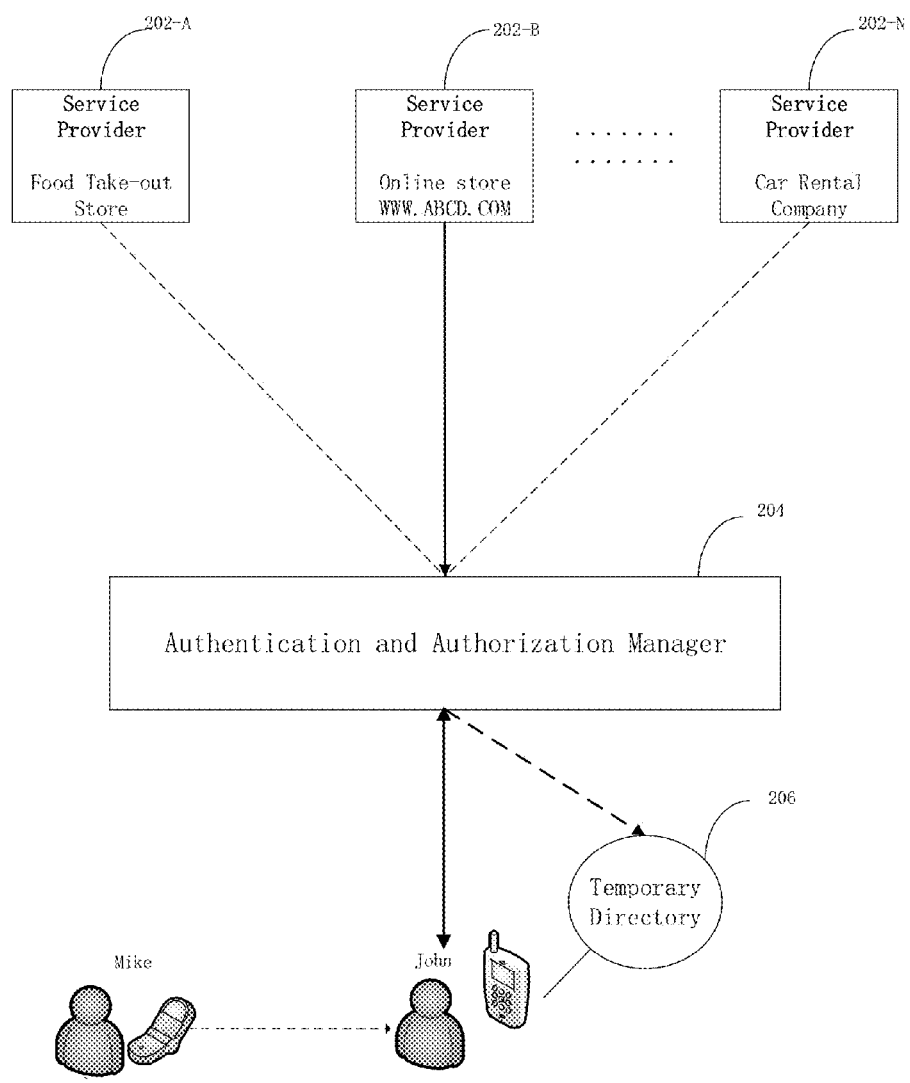
FIG. 2 is a block diagram of a overall system with signal flow graph to illustrate the solution where embodiments of the present disclosure can be implemented.

With reference to FIG. 2, FIG. 2 is a block diagram of an overall system to illustrate the solution where embodiments of the present disclosure can be implemented.

As shown in FIG. 2, 202-A to 202-N are various service providers. John is a customer who bought three books from an online store at the service provider 202-B called WWW.ABCD.COM. John is a service receiver and WWW.ABCD.COM is a service provider in the present disclosure. The online store needs to assign a courier to deliver the books, i.e. Mike shown on the left side of John. Of course Mike has to contact John to determine the time and John's availability before delivering the books to John's location. So here comes the problem. Since Mike's calling number is not in John's phone number directory, how could John identify Mike's phone number as a service call from ABCD online store that John has to pick up rather than filtering Mike's call as a crank call? In accordance with the embodiments of the present disclosure, the idea is to register Mike's phone number together with some basic information of John's order (like what he bought, where he bought from and etc.) to a temporary directory of John's cell phone for certain time period. So during this period, if Mike calls John for the delivery issue, John will quickly identify Mike's call as a service call from ABCD that he has to pick up. In this way, John will neither miss Mike's call to receive his books from ABCD nor pick up too many strange calls to avoid missing the service call from ABCD. Further, the basic information of John's procurement at ABCD online store will also be shown on the display of John's cell phone when Mike is calling.

Now FIG. 2 will be introduced with more detail. As shown in FIG. 2, various service providers 202-A-202-N may communicate with authentication and authorization manager 204. The service provider may send to the authentication and authorization manager 204 a request for registration to register their delegates' (like Mike is ABCD's delegate as a courier) phone numbers and basic information of their service receiver's order to relevant service receivers' phone book or directory. The authentication and authorization manager 204 may first verify the true identity of the service provider 202-B, in order to avoid any fake entity or individual to disguise. Then, if the service provider 202-B passes the authentication, the authentication and authorization manager 204 may further extract the service receiver's information from the received request for registration, and query John's cell phone whether John has authorized ABCD to register phone number and order information in the temporary directory 206 of John's cell phone. With a positive answer by John's cell phone, the authentication and authorization manager 204 may register Mike's phone number and basic information of John's procurement order to the temporary directory 206. Then Mike calls John to deliver the books and John will identify Mike's call as a service call that he should pick up.

It should be understood that above description of the example in FIG. 2 is just to briefly illustrate the overall idea of the present disclosure, without any limitation to the scope of the present invention. In accordance to the embodiments of the present disclosure, a "service provider" could be any entity or individual that provides service, with or without commercial purposes, to other entities or individuals. Typical service providers include but not limited to online stores, E-commerce business, car rental, food take-out business or any other O2O business. Sometimes, a service provider could also be someone who is going to communicate with some others on certain subjects during certain or uncertain time period. Thus all entities and/or individuals with whatever purpose to communicate with someone that they don't know could be a "service provider" under the present disclosure.

Further, though the authentication and authorization manager 204 is shown in FIG. 2 as a component separated from the service provider and the service receiver, it is only for illustration purpose to clearly describe a typical (but not sole) logic and structure of the present disclosure. It should be understood that the authentication and authorization manager 204 could be either implemented as part of a single service provider's system or as part of the service receiver's system or any type of user devices of the service receiver. When the authentication and authorization manager 204 is implemented as part of a single service provider's system, it may not provide an open platform for various service providers to register.

Further, according to an embodiment of the present disclosure, the temporary directory 206 is embedded in the service receiver's user device (John's cell phone in FIG. 2). According to yet another embodiment of the present disclosure, the temporary directory 206 is stored in remote server or cloud platform that could be accessed by service receiver's user device. Under this embodiment, when Mike calls John, information related to Mike's call needs to be retrieved from the remote server where it is stored to John's user device.

In addition, though it is shown in FIG. 2 that the authentication and authorization manager 204 registers Mike's phone number and basic information of John's procurement order to the temporary directory 206, it is only for exemplary purpose. According to another embodiment of the present disclosure, the service provider could do the registration action directly after the authentication and authorization manager 204 notifies the service provider of the authorization. According to another embodiment of the present disclosure, the authentication and authorization manager could pass through Mike's phone number and basic information of John's procurement order to some certain applications installed on John's cell phone to complete the registration to the temporary directory 206.

In all, the actor of registration to temporary directory could vary from case to case depending on different business and/or technical consideration under the present disclosure.

FIG. 3 is a flowchart of a method implemented in accordance with embodiments of the present disclosure. FIG. 3 describes the process by setting the authentication and authorization manager 204 shown in FIG. 2 or the service receiver's user device such as John's cell phone as the actor of the process. However, it should be noted that the process shown in FIG. 3 could also be performed by a service provider with appropriate adjustment of the description of steps without any deviation to the scope of the present disclosure, which is apparent to persons skilled in the art.

As shown in FIG. 3, at step S302, a request for registration from a service provider is received. The request for registration comprises characteristic information of a service call to be initiated from the service provider to a service receiver. As the term "service call" suggests, in accordance with an embodiment of the present disclosure, a service call is called from the service provider (or agents on behalf of the service provider) to the service receiver to perform a service. According to an embodiment of the present disclosure, the service provider sends a request for registration directly to the service receiver. According to another embodiment where some third party service is provided to cover various service providers (like the authentication and authorization manager 204 shown in FIG. 2), the service provider could send the request for registration firstly to the third party platform and then the third party platform could perform following actions. Yet according to another embodiment of the present disclosure, a service call could also be initiated from the service receiver to the service provider. For example, sometimes the buyer need to check the status of delivery of goods that he/she has bought from an online store, so the buyer has a need to call the deliverer of that store.

"Characteristic information" of the service call comprises at least one of the service abstract, period of validity of the service call, calling number of the service call, and identity of an individual to initiate the service call on behalf of the service provider. The "service abstract" may comprise the basic information of the service like the order information of John's procurement as described in FIG. 2. Persons skilled in the art may understand that certain service may have period of validity for the service call. For example, back to FIG. 2, the goods from online store ABCD are normally delivered to the service receiver in 2-5 days, depending on the location of service receiver and where the goods are delivered. The service provider could determine the period of validity for the service call and include this information in the characteristic information that will be packaged into the request for registration using common technical measures well known to persons skilled in the art. According to another embodiment of the present disclosure, the period of validity of the service call could also be negotiated between the service provider and the service receiver, or solely determined by the service receiver, depending on the specific scenario of the service content. For example, a service receiver would like to receive some bidding calls for air ticket from city A to city B by March 31 (the departure date of the service receiver), he/she may set the period of validity of service calls from air ticket agencies from current date till March 31 because the service calls from agencies after March 31 will be meaningless.

Figure 4A:
FIG. 4A is an example to illustrate the characteristic information of a service call in accordance with embodiments of the present disclosure.

A specific example of the characteristic information is shown in FIG. 4A in combination of the example described in FIG. 2. As shown in FIG. 4A, several elements of their corresponding values are contained in the characteristic information, like Service Provider=ABCD, Caller's name=Mike and so on. The Abstract element provides a brief summary of the service background to remind the service receiver of the service. The Begin date and End date define a period of validity of the service call to be received as described above. Finally the Action element refers to the action to be conducted for the characteristic information. For example, "Insert" means that it is now going to register the characteristic information for the service receiver, while the value of "remove" for "Action" could mean to deregister the characteristic information. Persons skilled in the art should understand that FIG. 4A is only for exemplary purpose, so neither the table format nor the content or expression of elements and values is to limit the scope of the present disclosure. The elements could be reduced or added based on different requirements and preference.

Next, at step S304, it is determined whether the service receiver has authorized the request for registration. In accordance with an embodiment of the present disclosure, the service receiver could overall authorize certain service providers beforehand so that the authorized service providers do not need to send each specific request for registration for service receiver's authorization. In this embodiment, the determination at step S304 actually could be done by determining whether the service receiver has overall authorized the service provider, and upon the determination result being yes, determining that the service receiver has authorized the request for registration. For example, there are some major service receivers in the market that need to contact service receivers to provide their services. To avoid reviewing and authorizing the request for registration for each service, the service receiver could overall authorize the service providers based on service receivers' willing and own preference. That being done, each following request for registration from the service provider that has been overall authorized will be directly determined as being authorized by the service receiver at step S304. In accordance with another embodiment of the present disclosure, the service receiver needs to authorize the request for registration specifically upon each time the service is to be provided. The reason for doing this is that there could be frequent new service providers into the market and the service receiver may not know some of the service providers beforehand so cannot conduct overall authorization. The reason could also be that the service receiver has concern on the credit of certain service provider so the service receiver wants to provide case-by-case authorization. According to yet another embodiment, before or at step S304, it is determined whether the service provider who sends the request for registration is the true service provider to avoid fake entities or individuals to disguise for some bad purposes. This authentication could be done through logging-in account and password check at a platform open to various service providers, but could also be done through many other ways of authentication for security reasons. It should be understood that above described embodiments are only for exemplary purposes, and persons skilled in the art could work out various methods to determine whether the service receiver has authorized the request for registration, without deviating from the scope of the present disclosure.

At step S306, upon the determination result being YES, the characteristic information of the service call is registered for the service receiver to enable the identification of the service call. An example of characteristic information has been described above with reference to FIG. 4A. In accordance with an embodiment under the present disclosure, the calling number contained in the characteristic information is registered in a temporary directory for the service receiver. The temporary directory, different from normal directory, could be used to store some call numbers that are only available during certain time period and will be removed upon lapse of the time period. According to an embodiment, the temporary directory is maintained at a user device of the service receiver, such as mobile phone, smart phone, PDA, IP phone, PC, or even traditional telephones as a local storage. According to yet another embodiment, the temporary directory is maintained at a remote server or cloud platform separated from the user device of the service receiver. No matter where the temporary directory is and how it is managed, it is within the scope of the present disclosure. It also should be understood that the term "temporary directory" used here is just for exemplary purpose. Normal directory could also be used to store the service caller's phone number as long as the service receiver has no security concern and agrees to do so. In all, any storage related to the service receiver that could be used to store the characteristic information is within the scope of the present disclosure.

Further in another embodiment, service abstract in the characteristic information of the service call is also added into the temporary directory, as identification information corresponding to the registered calling number. This will help the service receiver quickly identify, when the service call comes, which service provider the caller is representing and what the service background is.

Upon the determination result being NO at step S304, another branch will be conducted, i.e. step S312. At step S312, responding to the service provider of un-authorization. It should be understood that step S312 is not mandatory because if the service provider conducts S302 and S304, then there will be no "responding" by the service provider to itself. This is only for illustration where a separate server or cloud platform is implementing the process so a respond from the separate server back to the service provider would be necessary.

Additionally and/or alternatively, at step S308, whether a period of validity of the service call has lapsed is determined Upon lapse of the period of validity of the service call, at step S310, deregistering the calling number from the temporary directory. The reason why the period of validity of the service call is contained in the characteristic information has been explained above. To save the storage and to avoid future irrelevant calling from the caller outside the scope of the service, the record in the temporary directory is removed upon the lapse of certain period. According to an embodiment under the present disclosure, determination at step S308 could be conducted periodically such as every day, every week, or every month etc. According to another embodiment, the service receiver could also manually deregister the calling number from the temporary directory.

FIG. 3 has been described above in detail as an overall process to be implemented under embodiments of this present disclosure. However, it should be understood that not every step in FIG. 3 is mandatory. For example, S308, S310 and S312 could be neglected without affecting the implementation and/or achievement of the present disclosure.

Figure 4B:
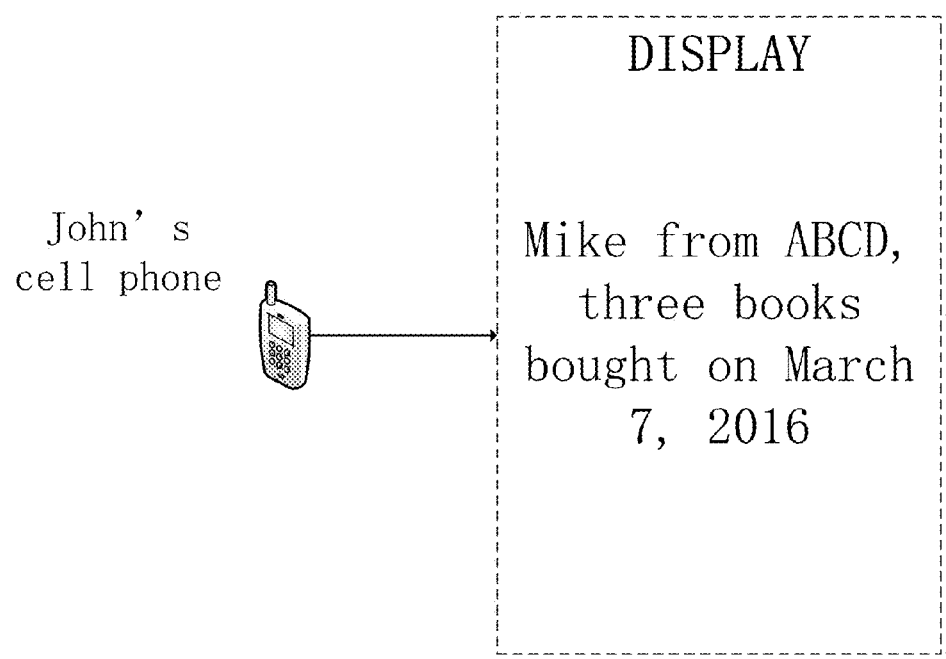
FIG. 4B is an example to illustrate the display of service receiver's cell phone when the service call comes in in accordance with embodiments of the present disclosure.

FIG. 4B is an example to illustrate the display of service receiver's cell phone when the service call comes in in accordance with embodiments of the present disclosure. In combination with the example described in FIG. 2, when Mike calls John before delivering the books, the information will be shown on the display of John's cell phone. Thus John is able to immediately identify the calling is from ABCD for the three books he procured on Mar. 7, 2016. So John decides to pick up the call. If another strange call comes in without being registered, John will still see the calling number as a strange number and thus John could decide to not pick up the call or other existing solutions could help to filter the call. However, it should be understood by persons skilled in the art that the displayed content as shown in FIG. 4B is only for illustration purpose. According to another embodiment of the present disclosure, only the caller's name—Mike is displayed on the cell phone screen. The displayed content could be shortened or added with additional information in accordance with the specific user requirement or system design.

Exemplary Aspects, Using a Cloud-Computing Environment

Although this detailed description includes an exemplary embodiment of the present invention in a cloud-computing environment, it is to be understood that implementation of the teachings recited herein are not limited to such a cloud-computing environment. Rather, embodiments of the present invention are capable of being implemented in conjunction with any other type of computing environment now known or later developed.

Cloud-computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud-computing is an infrastructure comprising a network of interconnected nodes.

Referring now to FIG. 1, a schematic of an example of a cloud-computing node is shown. Cloud-computing node 10 is only one example of a suitable node and is not intended to suggest any limitation as to the scope of use or functionality of embodiments of the invention described herein. Regardless, cloud-computing node 10 is capable of being implemented and/or performing any of the functionality set forth herein.

Although cloud-computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud-computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud-computing environments where tasks are performed by remote processing circuits that are linked through a communications network. In a distributed cloud-computing environment, program modules may be located in both local and remote computer system storage media including memory storage circuits.

Referring again to FIG. 1, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 5:
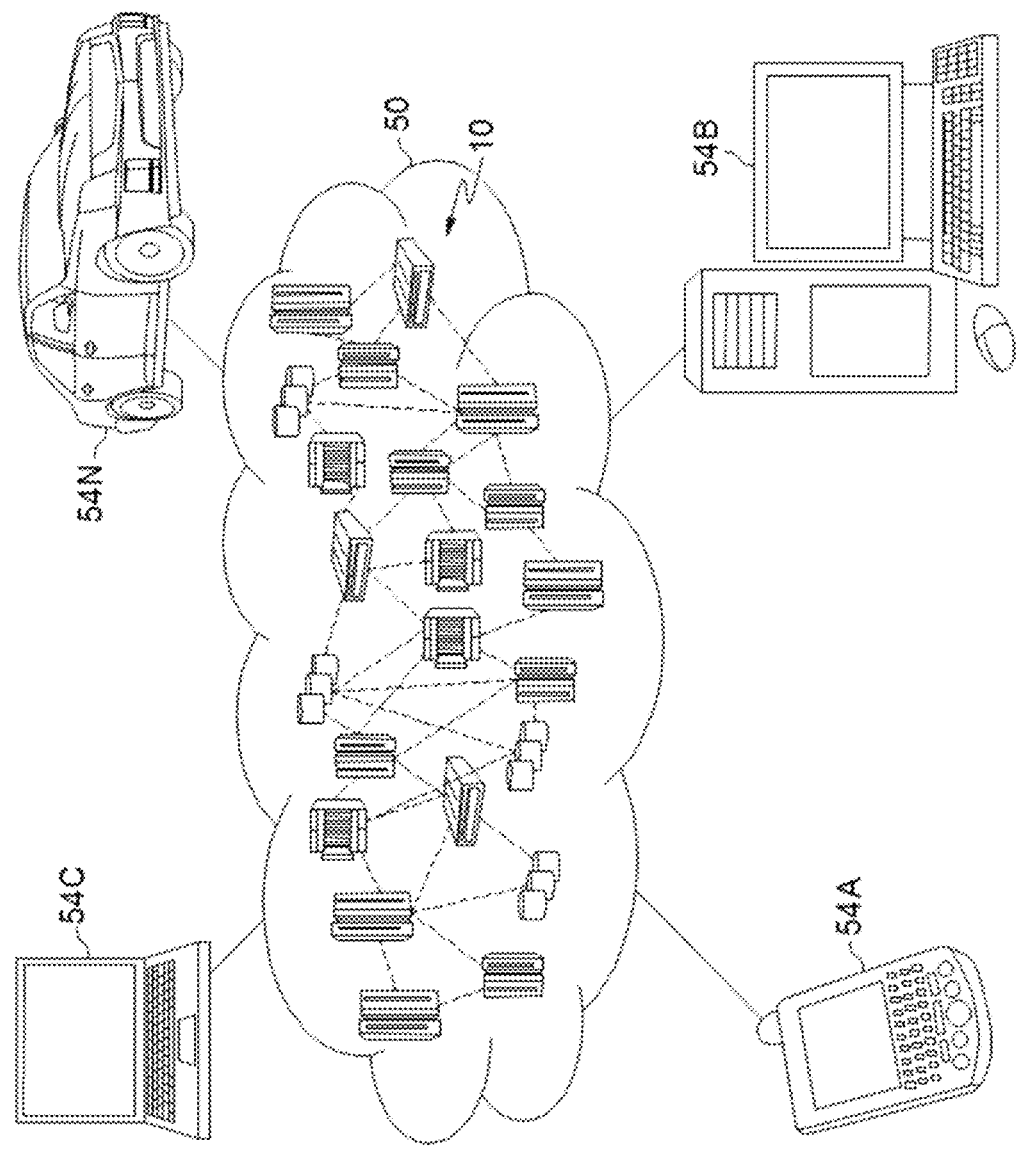
FIG. 5 depicts a cloud computing environment 50 according to an embodiment of the present invention.

Referring now to FIG. 5, illustrative cloud-computing environment 50 is depicted. As shown, cloud-computing environment 50 comprises one or more cloud-computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud-computing environment 50 can communicate with any type of computerized circuit over any type of network and/or network addressable connection (e.g., using a web browser).

Figure 6:
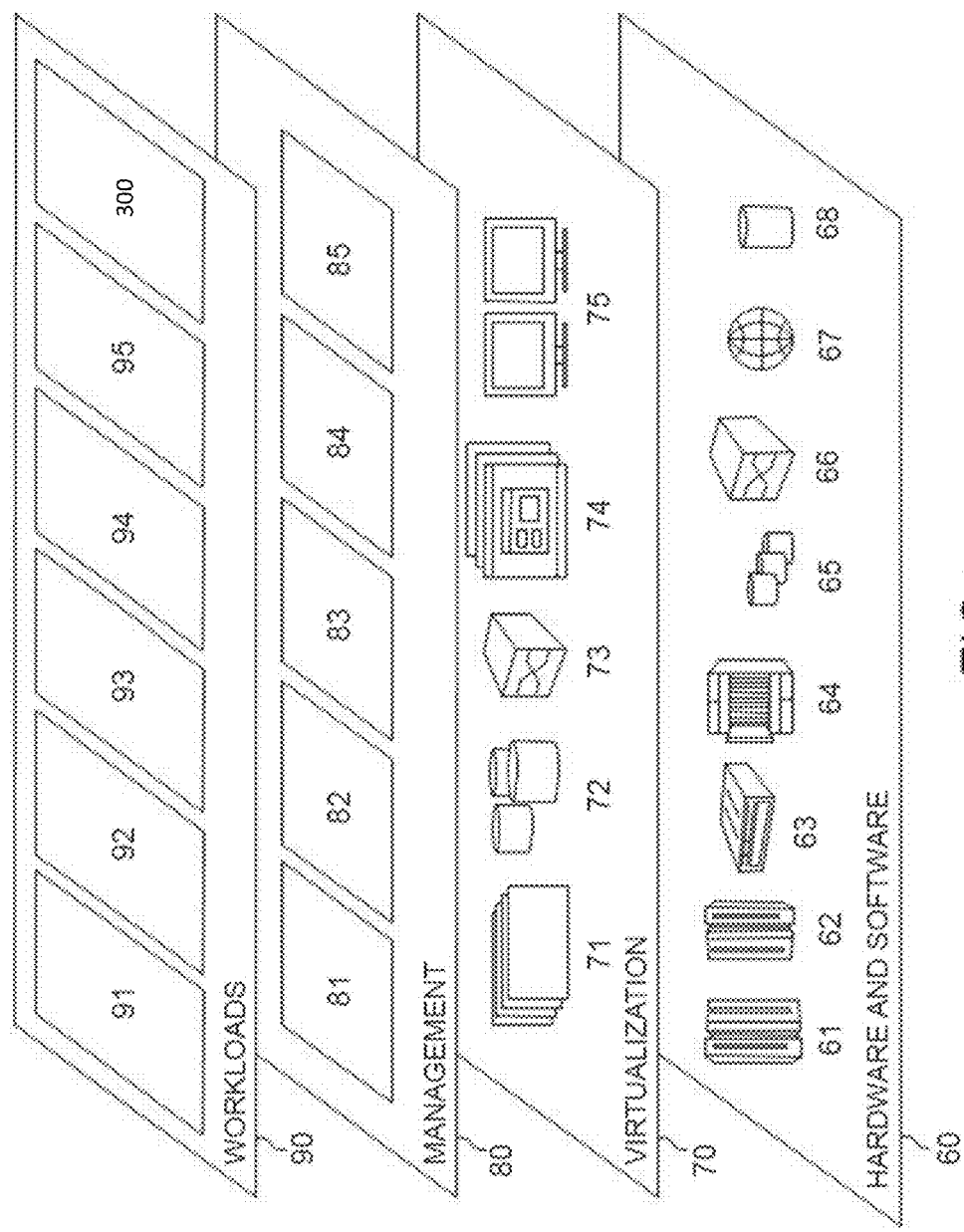
FIG. 6 depicts abstraction model layers according to an embodiment of the present invention.

Referring now to FIG. 6, an exemplary set of functional abstraction layers provided by cloud-computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud-computing resource allocation and management such that required service levels are met. Service Level Agreement (SLA) planning and fulfillment 85 provide pre-arrangement for, and procurement of, cloud-computing resources for which a future requirement is anticipated in accordance with an SLA.

Workloads layer 90 provides examples of functionality for which the cloud-computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the method 300.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method for service call identification, comprising:
   receiving a request for registration from a service provider, the request for registration comprising characteristic information of a service call to be initiated;
   determining whether the service receiver has authorized the request for registration; and
   upon the service receiver having authorized the request for registration, registering the characteristic information of the service call for the service receiver to enable the identification of the service call.

2. The method of claim 1, wherein the characteristic information of the service call is selected from a group consisting of:
   a service abstract;
   a period of validity of the service call;
   a calling number of the service call; and
   an identity of an individual to initiate the service call on behalf of the service provider.

3. The method of claim 1, wherein the determining whether the service receiver has authorized the request for registration comprises:
   determining whether the service receiver has overall authorized the service provider; and
   upon the service receiver having overall authorized the service provider, determining that the service receiver has authorized the request for registration.

4. The method of claim 1, wherein the determining whether the service receiver has authorized the request for registration comprises:
   determining whether the service receiver has made instruction on authorization or no authorization specific to the request for registration; and
   upon the service receiver having made the instruction on authorization, determining that the service receiver has authorized the request for registration.

5. The method of claim 1, wherein the registering the characteristic information of the service call for the service receiver comprises:
   registering a calling number in the characteristic information of the service call in a temporary directory for the service receiver.

6. The method of claim 5, wherein the registering the characteristic information of the service call for the service receiver further comprises:
   adding a service abstract in the characteristic information of the service call into the temporary directory, as an identification information corresponding to the registered calling number.

7. The method of claim 5, further comprising:
   upon lapse of a period of validity of the service call, deregistering the calling number from the temporary directory.

8. The method of claim 1, embodied in a cloud-computing environment.

9. A system for call service identification, said system comprising:
   a processor; and
   a memory, the memory storing instructions to cause the processor to:
      receive a request for registration from a service provider, the request for registration comprising characteristic information of a service call to be initiated;
      determine whether the service receiver has authorized the request for registration; and
      upon the service receiver having authorized the request for registration, register the characteristic information of the service call for the service receiver to enable the identification of the service call.

10. The system of claim 9, wherein the characteristic information of the service call is selected from a group consisting of:
   a service abstract;
   a period of validity of the service call;
   a calling number of the service call; and
   an identity of an individual to initiate the service call on behalf of the service provider.

11. The system of claim 9, wherein, to determine whether the service receiver has authorized the request for registration, the memory further stores instructions to cause the processor to perform:
   determining whether the service receiver has overall authorized the service provider; and
   upon service receiver having overall authorized the service provider, determining that the service receiver has authorized the request for registration.

12. The system of claim 9, wherein, to determine whether the service receiver has authorized the request for registration, the memory further stores instructions to cause the processor to perform:
   determining whether the service receiver has made instruction on authorization or no authorization specific to the request for registration; and
   upon the service receiver having made the instruction on authorization, determining that the service receiver has authorized the request for registration.

13. The system of claim 9, wherein, to register the characteristic information of the service call for the service receiver, the memory further stores instructions to cause the processor to perform:
   registering a calling number in the characteristic information of the service call in a temporary directory for the service receiver.

14. The system of claim 13, wherein the memory further stores instructions to cause the processor to perform:
   adding a service abstract in the characteristic information of the service call into the temporary directory, as an identification information corresponding to the registered calling number.

15. The system of claim 13, wherein the memory further stores instructions to cause the processor to perform:
   upon lapse of a period of validity of the service call, deregistering the calling number from the temporary directory.

16. The system of claim 9, embodied in a cloud-computing environment.

17. A computer program product for service call identification, the computer program product comprising a computer-readable storage medium having program instructions embodied therewith, the program instructions being executable by a computer to cause the computer to:
   receive a request for registration from a service provider, the request for registration comprising characteristic information of a service call to be initiated;
   determine whether the service receiver has authorized the request for registration; and
   upon the service receiver having authorized the request for registration, register the characteristic information of the service call for the service receiver to enable the identification of the service call.

18. The computer program product of claim 17, wherein the characteristic information of the service call is selected from a group consisting of:
   a service abstract;
   a period of validity of the service call;
   a calling number of the service call; and
   an identity of an individual to initiate the service call on behalf of the service provider.

19. The computer program product of claim 17, wherein the determining whether the service receiver has authorized the request for registration comprises:
   determining whether the service receiver has overall authorized the service provider; and
   upon determining that the service provider has overall authorized the service provider, determining that the service receiver has authorized the request for registration.

20. The computer program product of claim 17, wherein the determining whether the service receiver has authorized the request for registration comprises:
   determining whether the service receiver has made instruction on authorization or no authorization specific to the request for registration; and
   upon service receiver having overall authorized the service provider, determining that the service receiver has authorized the request for registration.

* * * * *